United States Patent
Boote

(10) Patent No.: US 7,704,009 B2
(45) Date of Patent: Apr. 27, 2010

(54) AXIAL SPACER FOR A ROTATIONAL ASSEMBLY

(76) Inventor: Carey J. Boote, 14000 172$^{nd}$ Ave., Grand Haven, MI (US) 49417

(*) Notice: Subject to any disclaimer, the term of this patent is extended or adjusted under 35 U.S.C. 154(b) by 388 days.

(21) Appl. No.: 11/135,574

(22) Filed: May 23, 2005

(65) Prior Publication Data
US 2006/0216110 A1 Sep. 28, 2006

Related U.S. Application Data

(60) Provisional application No. 60/665,463, filed on Mar. 25, 2005.

(51) Int. Cl.
F16D 1/033 (2006.01)
F04D 29/26 (2006.01)

(52) U.S. Cl. .................. 403/408.1; 403/13; 403/286; 301/35.627; 301/35.629

(58) Field of Classification Search .................. 403/13, 403/14, 286, 298, 408.1; 464/93–96, 98, 464/99; 301/35.627, 35.629; 277/626; 404/26
See application file for complete search history.

(56) References Cited

U.S. PATENT DOCUMENTS

| | | | | |
|---|---|---|---|---|
| 1,860,665 | A * | 5/1932 | Eksergian | 301/35.627 |
| 2,702,995 | A * | 3/1955 | Biedess | |
| 2,998,717 | A * | 9/1961 | Schwenk | 464/93 |
| 3,649,079 | A * | 3/1972 | English | 301/35.627 |
| 3,656,769 | A * | 4/1972 | Jelinek et al. | |
| 4,269,417 | A * | 5/1981 | Dutton | |
| 5,135,133 | A * | 8/1992 | Frost | |
| 5,362,175 | A * | 11/1994 | Begin | 404/26 |
| 5,470,172 | A * | 11/1995 | Wiedrich | 404/26 |
| 5,514,038 | A * | 5/1996 | Harpin | 464/93 |
| 5,542,785 | A * | 8/1996 | Cloud | 405/239 |
| 5,564,855 | A * | 10/1996 | Anderson | 404/26 |
| 5,851,109 | A * | 12/1998 | Reynolds | |
| 5,964,022 | A * | 10/1999 | Mann et al. | 29/458 |
| 6,213,883 | B1 * | 4/2001 | Giere | 464/93 |

(Continued)

FOREIGN PATENT DOCUMENTS

EP 703100 A2 * 3/1996

OTHER PUBLICATIONS

Photograph of Spacer Provided by Applicant Mar. 24, 2005, or earlier (Exhibit A).

Primary Examiner—Daniel P Stodola
Assistant Examiner—Ernesto Garcia
(74) Attorney, Agent, or Firm—King & Partners, PLC

(57) ABSTRACT

An axial spacer for a rotational assembly comprising a body, a rotational assembly attaching member and a centering member. The body comprises an outer ring, an inner ring and a plurality of reinforcing members extending between the inner ring and the outer ring. The reinforcing members each comprise an annular reinforcing rim extending from the outer ring and a connecting beam extending from the annular reinforcing rim to the inner ring. A plurality of web members extend between adjacent reinforcing members and the inner and outer ring, to, in turn, substantially couple adjacent reinforcing members with the inner and outer ring therebetween. The attaching means comprises an opening extending through at least a plurality of the plurality of reinforcing members. The centering member centers the spacer relative to the rotational assembly.

12 Claims, 10 Drawing Sheets

U.S. PATENT DOCUMENTS 6,663,187 B2 * 12/2003 Fitzgerald .............. 301/35.629
6,959,789 B2 * 11/2005 Torii et al. ................... 301/6.8
2004/0232291 A1 * 11/2004 Carnevali ................. 248/206.5

* cited by examiner

AXIAL SPACER FOR A ROTATIONAL ASSEMBLY

CROSS REFERENCE TO RELATED APPLICATION

This application claims the priority of U.S. Provisional Patent Application Ser. No. 60/665,463 filed Mar. 25, 2005, entitled "Axial Spacer for a Rotational Assembly" as well as U.S. Design patent application Ser. No. 29/226,227 filed Mar. 25, 2005, entitled "Spacer Apparatus," the entire specification of each is incorporated by reference.

BACKGROUND OF THE INVENTION

1. Field of the Invention

The present invention relates in general to spacers, and more particularly, to an axial spacer for a rotational assembly, such as, for example, a cooling fan of a vehicle. The invention is not limited to a sole application, but has utility in association with other rotational assemblies and applications.

2. Background Art

The use of spacers is well known in the art. For example, spacers may be utilized on axles and other rotating components to change the axial positioning of an accessory attached thereto. Such spacers comprise extruded members or milled members, which are often formed from metal, or an alloy thereof.

While such spacers have been utilized with success, there have been some drawbacks. For example, spacers are often quite heavy. Thus, they add to the overall rotational load imposed upon the rotating component. This added rotating mass often negates any advantage provided by the axial spacing. Additionally, in other applications, a properly sized spacer is difficult to achieve, and spacers may require special milling or other procedures to achieve a desired dimensional configuration. As such, the use of a conventional spacer may improve the overall operation, but it may remain substantially less than optimized.

Accordingly, it is an object of the invention to provide a spacer which reduces weight and spinning mass, to increase the utility of same, especially, where weight considerations are crucial.

It is another object of the invention to provide for spacers which can be stacked together to achieve a desired thickness.

It is another object of the invention to overcome shortcomings with prior art spacers which suffer from the above-described deficiencies.

These and other objects of the invention will become apparent in light of the specification and claims appended hereto.

SUMMARY OF THE INVENTION

In one aspect of the invention, the invention comprises an axial spacer for a rotational assembly. The axial spacer comprises a body having an outer ring, an inner ring spaced apart from the outer ring, a plurality of reinforcing members extending between the inner ring and the outer ring, and, a plurality of web members extending between adjacent reinforcing members and the inner and outer rings. Furthermore, the axial spacer includes means for attaching the spacer to a rotational assembly and a centering means. The attaching means comprises an opening extending through at least a plurality of the plurality of reinforcing members. The centering means centers the spacer relative to the rotational assembly.

In one embodiment, the plurality of reinforcing members each comprise an annular reinforcing rim extending from the outer ring, and, a connecting beam extending from the annular reinforcing rim to the inner ring.

In one preferred embodiment, an arcuate portion of the annular reinforcing rim substantially blends with the outer ring. In one such embodiment, the arcuate portion is about $\pi/2$ radians.

In another preferred embodiment, the connecting beam of each of the plurality of reinforcing members extends substantially tangentially from the inner ring and substantially tangentially from the respective annular reinforcing rim.

In another preferred embodiment, the annular reinforcing rim has a diameter which is greater than $1/8$ that of the outer ring.

In yet another preferred embodiment, the plurality of reinforcing members comprises six evenly spaced reinforcing members.

In another preferred embodiment, the width of the connecting beam of each of the reinforcing members is substantially equal to the radial thickness of each of the inner ring and the outer ring.

In another preferred embodiment, the web members each have a thickness which is between approximately $1/10$ and $9/10$ that of the outer ring. Preferably, the web members each have a thickness which is approximately $1/3$ that of the outer ring.

In another preferred embodiment, the annular reinforcing rim further includes a compression limiter insert associated therewith. The compression limiter insert limits the compression of the axial spacer upon deployment thereof.

In yet another preferred embodiment, each of the web members are substantially planar and of a substantially uniform thickness.

In another preferred embodiment, the annular reinforcing rim of each of the reinforcing members and the respective opening extending therethrough define a radial thickness of the annular reinforcing rim. The radial thickness of the annular reinforcing rim is substantially equal to a radial thickness of the outer rim.

In a preferred embodiment, a radial thickness of the outer ring is substantially identical to the radial thickness of the inner ring.

Preferably, the centering means further comprises a centering flange disposed on an inner surface of the inner ring.

In another preferred embodiment, the spacer further comprises means for stacking further axial spacers. In one such embodiment, the stacking means further comprises a plurality of arcuate plugs extending from a plurality of web members. The arcuate plugs are capable of interfacing with a web member of another axial spacer, to, in turn, facilitate the stacking of same.

In another aspect of the invention, the invention comprises an axial spacer having a body, attaching means and centering means. The body comprises an outer ring, an inner ring, a plurality of reinforcing members and a plurality of web members. The inner ring is spaced apart from the outer ring. Each of the reinforcing members comprises an annular reinforcing rim extending from the outer ring and a connecting beam extending from the annular reinforcing rim to the inner ring. The plurality of web members extend between adjacent reinforcing members and the inner and outer ring, to, in turn, substantially couple adjacent reinforcing members with the inner and outer ring therebetween. The attaching means comprises an opening extending through at least a plurality of the plurality of reinforcing members. The centering means centers the spacer relative to the rotational assembly.

In a preferred embodiment, the annular reinforcing rim of each of the plurality of reinforcing members is blended into the outer ring.

In another aspect of the invention, the invention comprises a plurality of axial spacers, wherein one of the axial spacers includes means for stacking adjacent spacers. The stacking means comprises an arcuate plug extending from a plurality of web members. The plurality of arcuate plugs are received in a cavity defined by the inner ring, and a pair of adjacent reinforcing members, when positioned in a proper stacked orientation.

In a preferred embodiment, the reinforcing members of each of the first and second axial spacers each comprise an annular reinforcing rim coupled to the outer ring and a connecting beam extending from the respective annular reinforcing rim to the respective inner ring.

BRIEF DESCRIPTION OF THE DRAWINGS

The invention will now be described with reference to the drawings wherein.

DETAILED DESCRIPTION OF THE INVENTION

Figure 1:
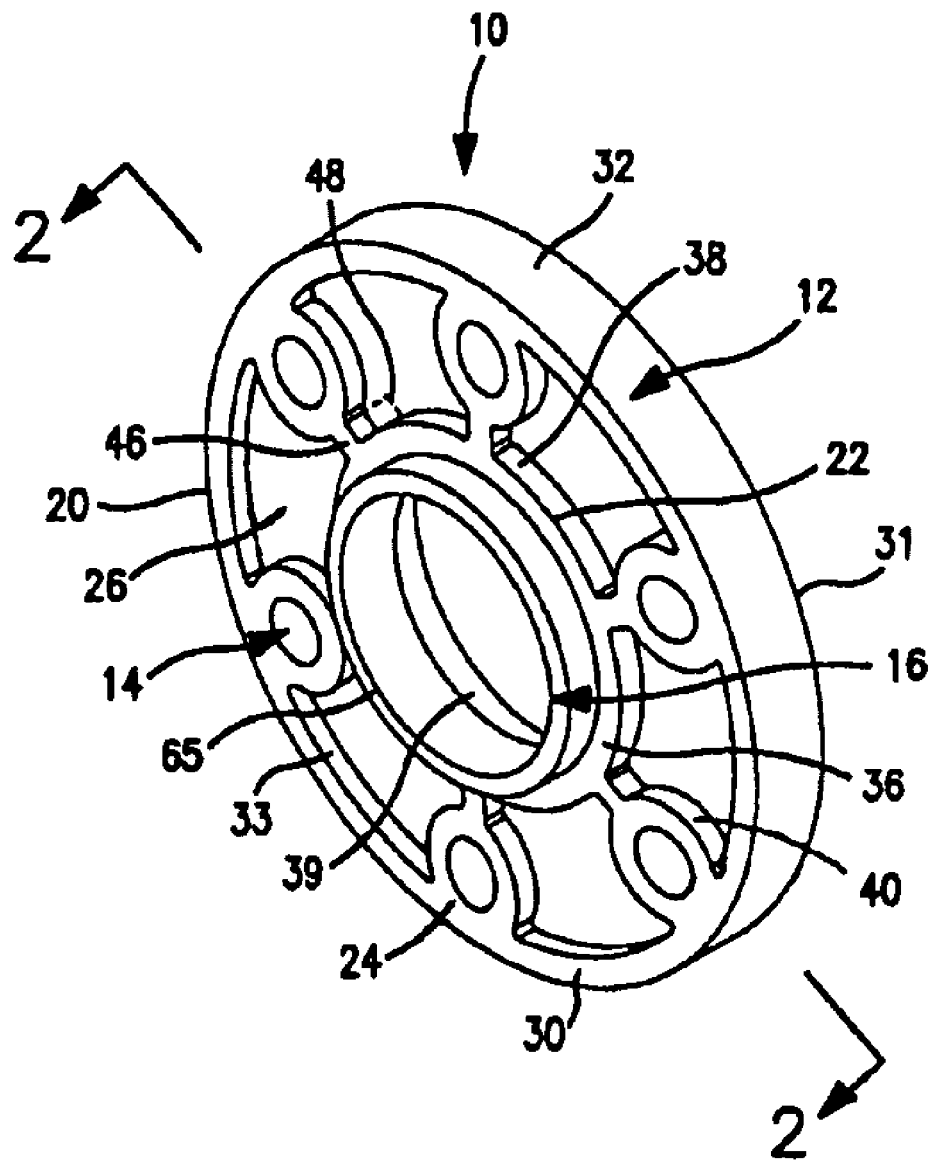
FIG. 1 of the drawings comprises a perspective view of an embodiment of the axial spacer of the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 10:
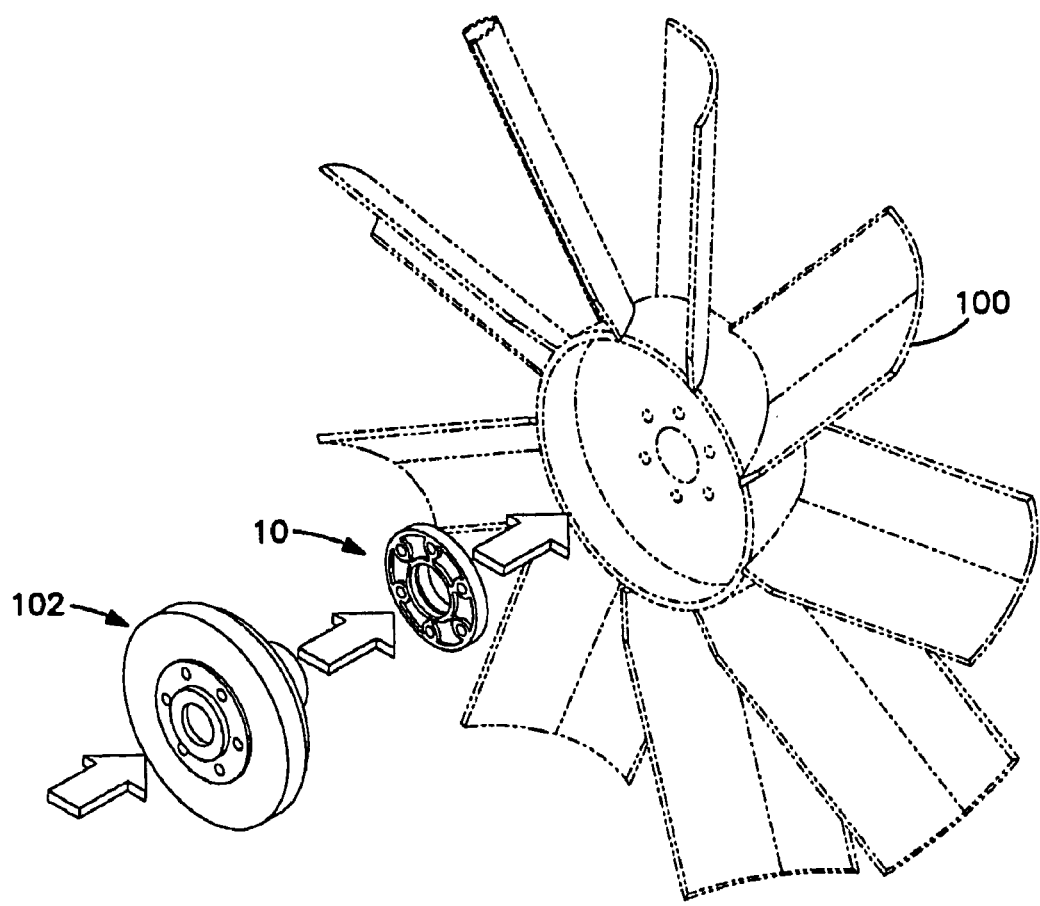
FIG. 10 of the drawings comprises an exploded perspective view of an axial spacer in a vehicle cooling system environment.

Referring now to the drawings and in particular to FIG. 1, axial spacer 10 (hereinafter "spacer") for a rotational assembly is shown. The spacer comprises body 12, means 14 for attaching the spacer to a rotational assembly, and, means 16 for centering the spacer to a rotational assembly. With reference to FIG. 10, the spacer is shown in a vehicle cooling application, wherein spacer 10 is positioned between output shaft 102 and cooling fan 100 so as to properly position the cooling fan vis-à-vis a shroud (not shown). With the proper axial positioning of the cooling fan with respect to the shroud, maximum efficiency and flow across a radiator (not shown) can be achieved.

Body 12 is shown in FIGS. 1 through 4, collectively, as comprising outer ring 20, inner ring 22, reinforcing members, such as reinforcing member 24 and web members, such as web member 26. Outer ring 20 includes top surface 30, bottom surface 31, outer surface 32 and inner surface 33. Top surface 30 and bottom surface 31 cooperate to define thickness 34; similarly, outer surface 32 and inner surface 33 cooperate to define radial thickness 35. The top and bottom surfaces are generally substantially planar and parallel to each other such that thickness 34 is substantially uniform. The outer and inner surfaces are substantially concentric, such that the radial thickness 35 is substantially uniform.

Inner ring 22 is shown in FIGS. 1 through 4, collectively, as comprising top surface 36, bottom surface 37, outer surface 38 and inner surface 39. Top surface 36 and bottom surface 37 cooperate to define thickness 27. Similarly, outer surface 38 and inner surface 39 cooperate to define radial thickness 29. The top and bottom surfaces are generally substantially planar and parallel to each other such that thickness 27 is substantially uniform. The outer and inner surfaces are substantially concentric, such that the radial thickness 29 is substantially uniform. Moreover, the thicknesses 34 and 27 are substantially identical. In the embodiment shown, the radial thicknesses are likewise substantially identical. It will be understood that other embodiments are likewise contemplated, wherein such thicknesses may be varied.

Reinforcing members, such as reinforcing member 24, are spaced about the center of the body in a substantially uniformly distributed manner. In the embodiment shown, six reinforcing members are spaced apart a distance of $\pi/3$ radians from each other. In other embodiments, a fewer or a greater number of reinforcing members may be spaced apart across the body, and it is contemplated that in certain embodiments, such spacing may or may not be uniform. Additionally, while a particular structure for the reinforcing members is shown, variations are contemplated for coupling the outer and inner rings.

Inasmuch as each of the reinforcing members are substantially identical, reinforcing member 24 will be described with the understanding that the remaining reinforcing members have similar, if not identical, components. Reinforcing member 24 includes annular reinforcing rim 40 and connecting beam 46.

Annular reinforcing rim 40 (hereinafter "reinforcing rim") includes top surface 41, bottom surface 42 and radius 43. The top and bottom surfaces define thickness 47. Thickness 47 is substantially identical to thickness 34 of the outer ring 20. Reinforcing rim 40 blends into outer ring over a portion of its circumference. Preferably, about $\pi/2$ radians±$\pi/6$ radians blend into the outer ring, and are integral therewith. In the embodiment shown, radius 43 is about ⅛ that of the radius of the outer ring, although variations are likewise contemplated.

Figure 11:
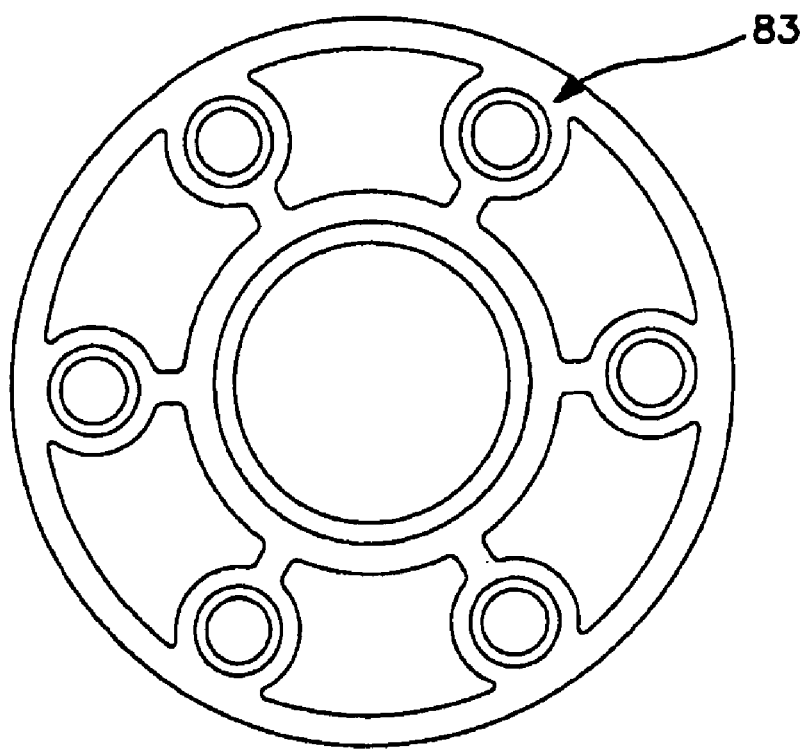
FIG. 11 of the drawings comprises a top plan view of another embodiment of the axial spacer of the present invention, showing, in particular, a compression limiter insert.
Figure 12:
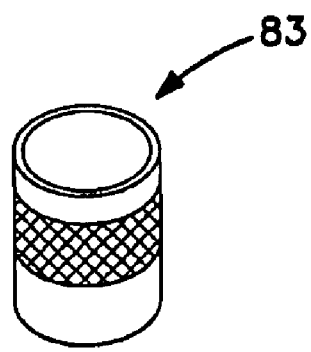
FIG. 12 of the drawings comprises a perspective view of the compression limiter insert of the embodiment shown in FIG. 11.

In one embodiment, as is shown in FIGS. 11 and 12, a compression limiter insert 83 may be molded or otherwise inserted so as to form a part of the annular reinforcing rim. The compression limiter insert comprises a material which is generally less compressible (i.e., stronger in compression) than the material from which the reinforcing rim is constructed. In this manner, the compression limiter insert insures that the body will not be compressed beyond that which is desired. Additionally, in certain applications, the compression limiter insert allows for the use of materials at higher temperatures than would be otherwise acceptable. In the present embodiment, the compression limiter insert 83 comprises a aluminum, however, other metals, alloys thereof, polymers and composites are likewise contemplated.

Connecting beam 46 spans between each reinforcing rim 40 to inner ring 22. In the embodiment shown, the connecting beam extends tangentially from inner ring 22 and tangentially intersects with the respective reinforcing rim 40. The connecting beam includes top 44, bottom 45 and thickness 48. Thickness 48 substantially corresponds to the thickness 47 as well as the thicknesses 34 and 27 of the outer and inner rings, respectively. Moreover, the connecting beam width is substantially equal to the radial thickness 35 of the outer ring.

Figure 4:
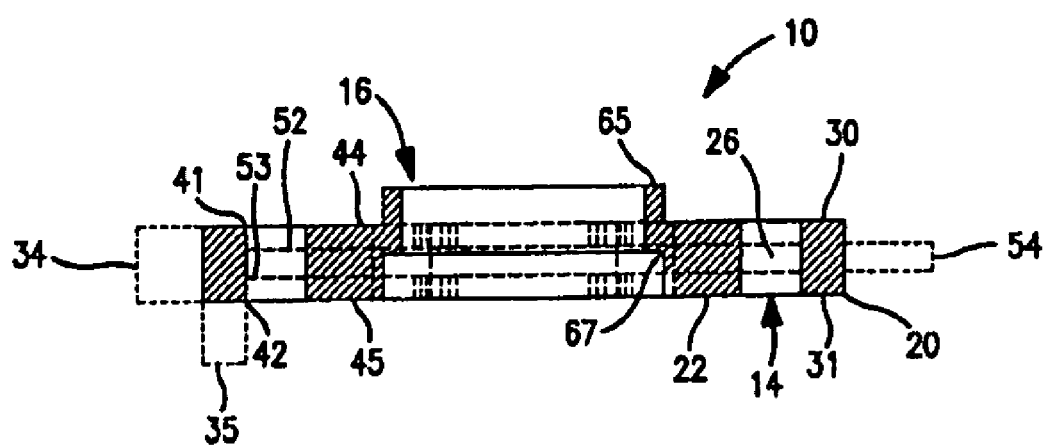
FIG. 4 of the drawings comprises a cross-sectional view of an embodiment of the axial spacer of the present invention, taken generally about lines 4-4 of FIG. 3.
Figure 5:
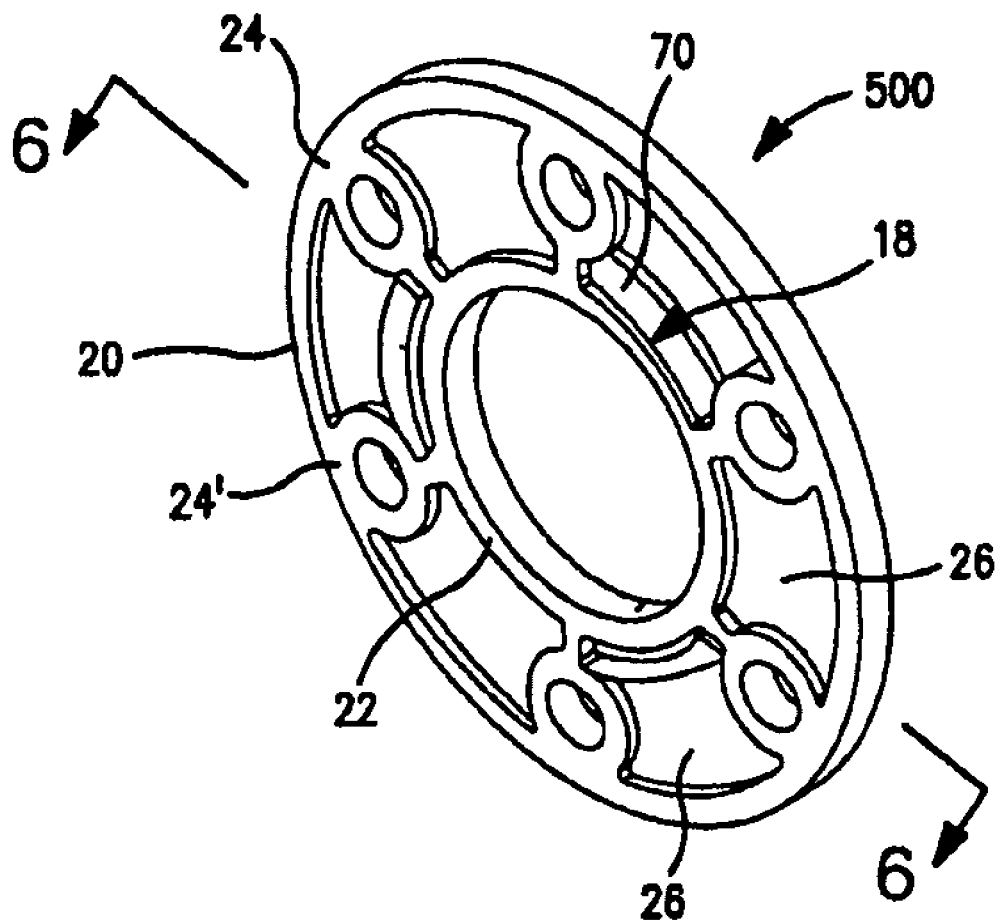
FIG. 5 of the drawings comprises a perspective view of an embodiment of the axial spacer of the present invention.
Figure 6:
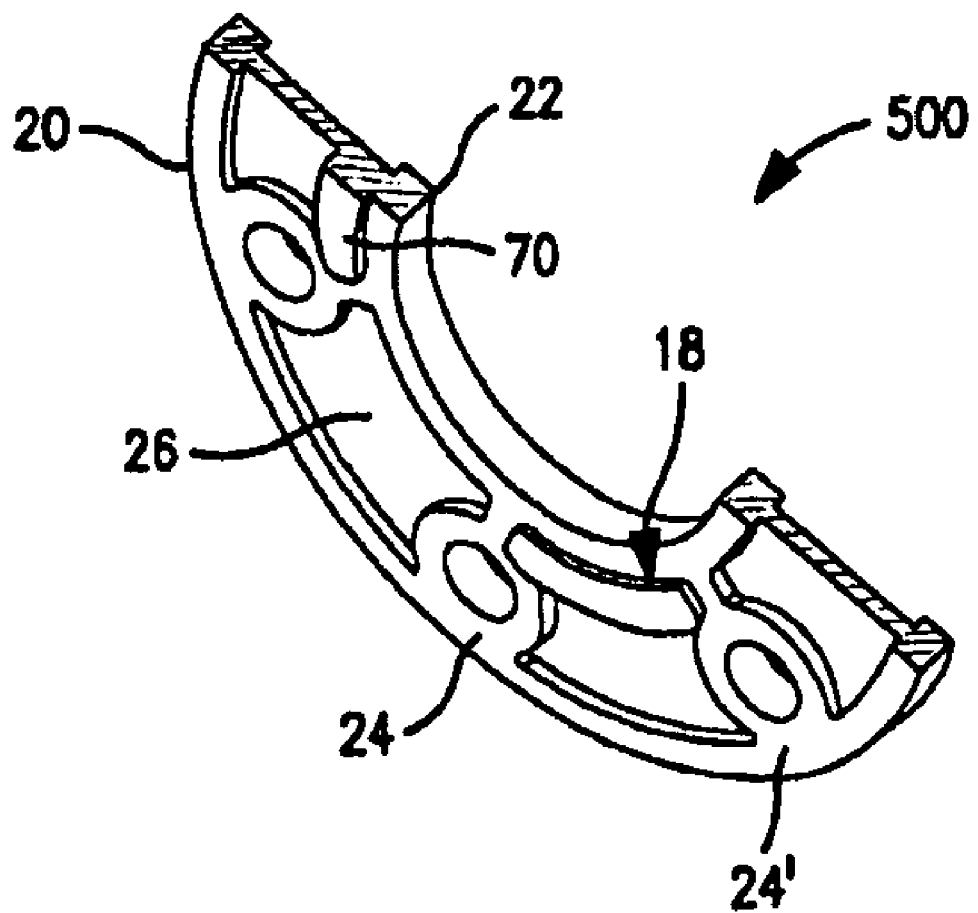
FIG. 6 of the drawings comprises a cross-sectional perspective view of an embodiment of the axial spacer of the present invention, taken generally about lines 6-6 of FIG. 5.
Figure 7:
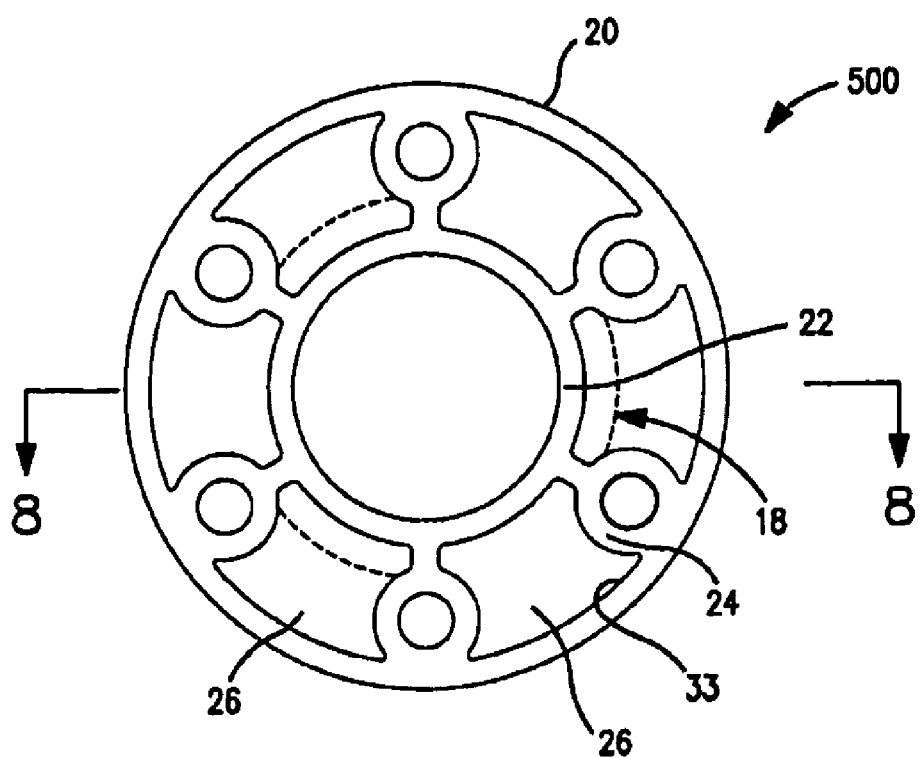
FIG. 7 of the drawings comprises a top plan view of an embodiment of the axial spacer of the present invention.
Figure 8:
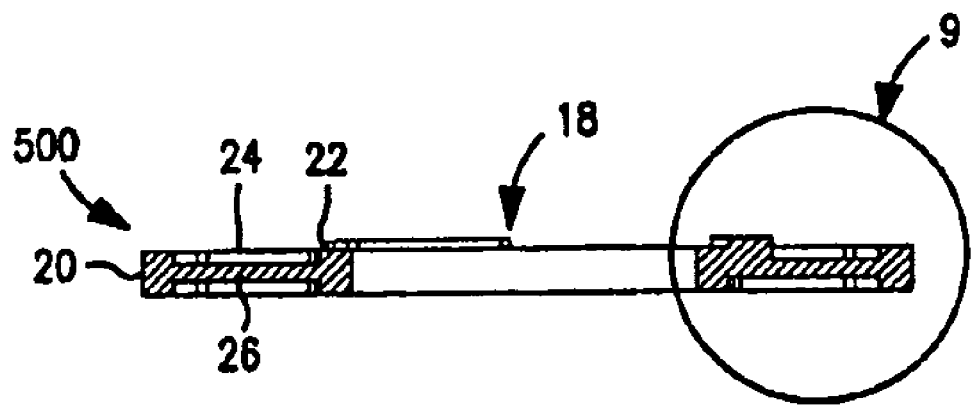
FIG. 8 of the drawings comprises a cross-sectional view of an embodiment of the axial spacer of the present invention, taken generally about lines 8-8 of FIG. 7.
Figure 9:
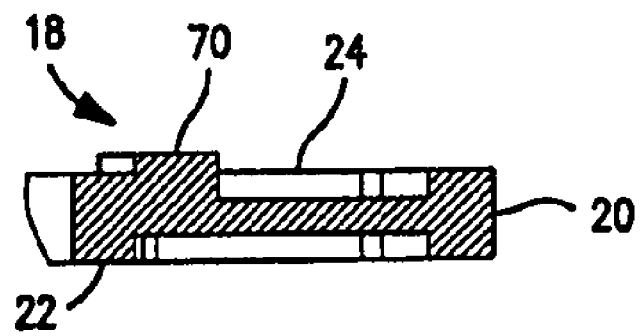
FIG. 9 of the drawings comprises an enlarged partial cross-sectional view of an embodiment of the axial spacer of the present invention shown in detail circle 9 of FIG. 8.

Web members, such as web member 26, are positioned between the outer and inner rings and between adjacent reinforcing members. Web member 26 will be described with the understanding that the remaining webs are substantially similar, if not identical, to web member 26. As is shown in FIG. 4, web member 26 includes top surface 52 and bottom surface 53. The top and bottom surfaces define a thickness 54 which is less than that of any one of the outer ring, inner ring and the reinforcing members. In the embodiment shown, thickness 54 is approximately ⅓ that of thickness 34. Of course it is contemplated that the thickness 54 may be increased or decreased, depending on the embodiment, from for example, ¹⁄₁₀ that of thickness 34 to approximately ⁹⁄₁₀ that of thickness 34. While the web members are shown to bisect thickness 34, it is contemplated that the web members may be positioned at any one of a number of locations along thickness 34.

Figure 3:
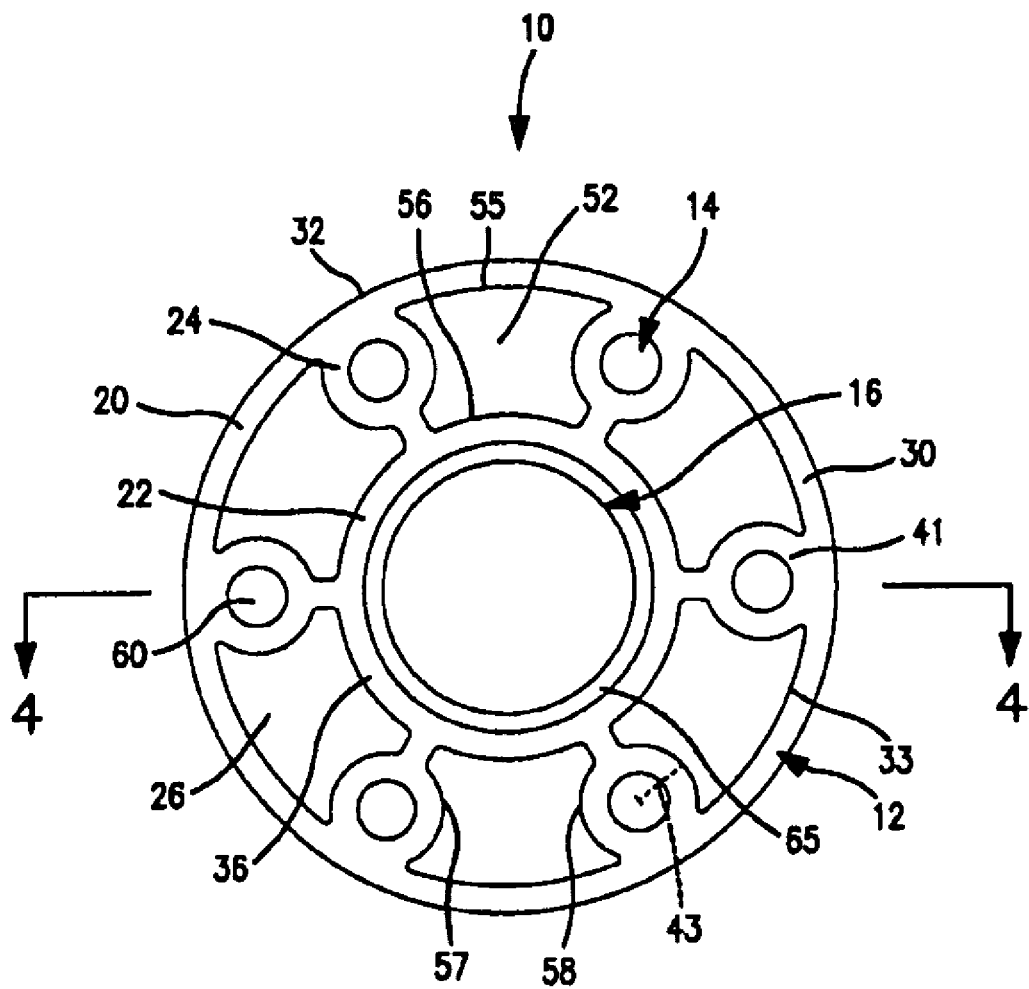
FIG. 3 of the drawings comprises a top plan view of an embodiment of the axial spacer of the present invention.

With particular reference to FIG. 3, web member 26 further includes outer ring edge 55, inner ring edge 56 and opposing reinforcing member edges 57, 58. As such, the web member spans the entire distance between the respective rings and reinforcing members, to define a recessed cavity. While the web member is shown as being continuous, it is contemplated that the web member may include a plurality openings, surface variations and other features which function to decrease weight, relieve stresses, etc. It is likewise contemplated that each web member may have a different configuration.

It is contemplated that body 12 comprises a single integrated member, which, for example is cast, molded, machined, forged or otherwise formed. In the embodiment contemplated, body 12 comprises a combination of recycled thermoplastic, thermoset plastic, and filler material, which, when combined, yield a member of sufficient strength and integrity. It is contemplated that metals, alloys thereof, composites and other polymers may likewise be utilized. It is also contemplated that the shape of body 12 may be other than a substantially circular configuration, including, but not limited to, square, polygonal, arbitrary, etc.

Figure 2:
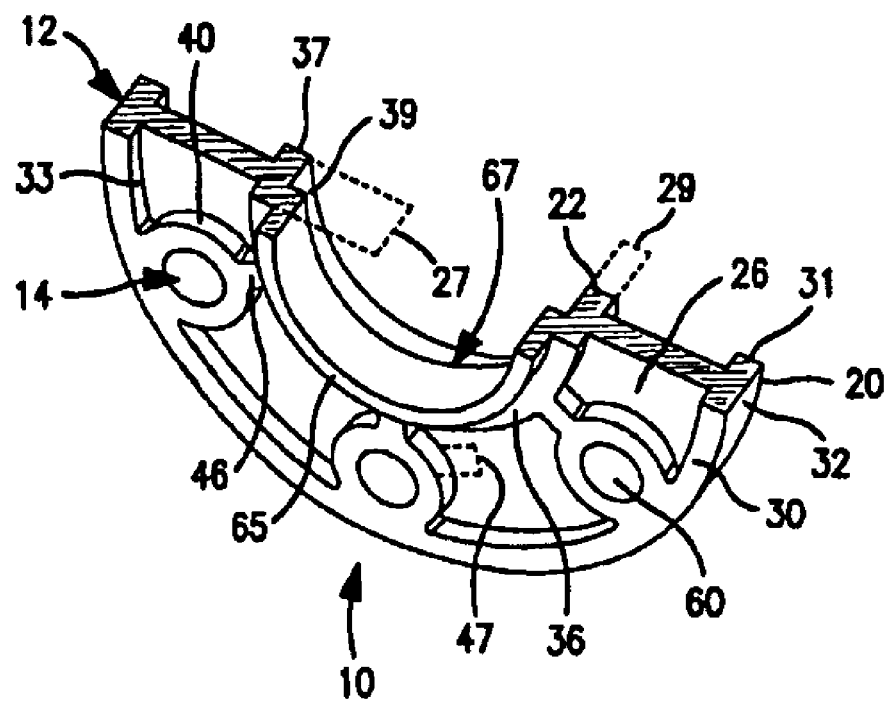
FIG. 2 of the drawings comprises a cross-sectional perspective view of an embodiment of the axial spacer of the present invention, taken generally about lines 2-2 of FIG. 1.

Spacer attaching means 14 is shown in FIGS. 1 through 3 as comprising a plurality of openings, such as opening 60, which extend through the annular reinforcing rims. In the embodiment shown, each opening is concentric with the reinforcing rim 40, and the opening has a diameter that is about half that of the reinforcing rim. As such, the remaining radius of the reinforcing rim that is not a part of the opening has a radial dimension substantially identical to that of the width of the connecting beam. While not required, the openings are spaced an identical distance from the center of the body (i.e., the center of rotation), and equally spaced in an arcuate pattern around the body.

Centering means 16 is shown in FIGS. 1 through 4, collectively, as comprising centering flange 65. Centering flange 65 is concentric with inner ring 22. The centering flange is offset relative to the inner ring, such that it extends beyond top surface 36 thereof and such that it terminates prior to bottom surface 37 of the inner ring. As is shown in FIGS. 1, 2 and 4, the centering flange and the inner ring cooperate to form step 67. During the attachment of the body to the rotational assembly, the centering flange along with the inner ring facilitate the proper positioning and centering of the body relative to the rotational assembly. Of course, other structures are contemplated for use, such as keyways, and other axial features, among others.

In another embodiment of the invention, shown in FIGS. 5 through 9, it is contemplated that a plurality of axial spacers 500 can be stacked upon each other to define an overall thickness of the spacer. For example, a kit may be provided of a number of differently sized spacers 500 to permit a large variation in overall thickness of the resulting spacer depending on the individual spacers that are stacked.

The embodiment of FIGS. 5 through 9 further includes stacking means 18. The stacking means facilitate the proper orientation and centering of the various spacers relative to each other. Without proper centering, the rotational mass would be improperly balanced, leading to failure and undue stress upon components. The stacking means comprises a plurality of arcuate plugs 70 positioned on one of the top and bottom surfaces of certain web members. The arcuate plugs are designed to interface with a web member 26 free of such an arcuate plug, by abutting outer surface 38 of inner ring 22 and two adjacent reinforcing members 24, 24'. Of course, any number of configurations for the arcuate plugs are contemplated. For example, the arcuate plugs may take a configuration which abuts opposing reinforcing members and inner surface 33 of outer ring 20. In another embodiment, the plugs may be configured such that two separate plugs are positioned within the cavity created by a web member. The invention is not limited to any particular configuration of the plugs (arcuate or otherwise), as long as the plugs are capable of falling within the confines of the inner and outer rings and the reinforcing members, overlying at least a portion of a respective web member.

With particular reference to FIG. 10, the operation of the spacer will be described in an automotive cooling fan operation. It will be understood that the spacer of the present invention is not limited to this application. As the optimal position of the automotive cooling fan 100 is reached with respect to a shroud (not shown), the more effectively the cooling fan can pull (or push) air beyond the radiator (not shown). Often, a cooling fan is positioned too far from or too close to the shroud, such that its cooling efficiency is greatly reduced.

Accordingly, a user first determines the axial position of the cooling fan for maximum cooling efficiency. Once determined, the user can find an appropriately sized spacer. The user then attaches cooling fan 100 to spacer 10 and to output shaft 102 of an underlying power supply (in the case of an automobile, an accessory belt or an electric motor). In particular, the spacer is guided to the proper orientation by the centering means. Once centered and once coupled to the output shaft of a power supply, the cooling fan is attached to the spacer.

Next, the user can determine if the positioning of the fan relative to the shroud is correct. If it is not correct, the user can re-measure and utilize a differently sized spacer. If no spacer of the correct thickness is available, the user can utilize a plurality of stackable spacers in a stacked orientation. Specifically, the user first selects a plurality of spacers which, when stacked, correspond to the desired thickness. Next, the user sequentially stacks the spacers such that the arcuate plugs overly respective web members in a proper orientation relative to the inner ring and reinforcing members. Such a position insures that the spacers will be centered relative to each other.

Once the stack of spacers is assembled, the stack of spacers will behave as a single unitary spacer. The user then follows the installation steps outlined above with respect to a single unitary spacer. If, after fitting, the spacer thickness does not result in an optimal positioning of the fan relative to the shroud, then the user can re-measure to determine the desired thickness. The user can add or remove stackable spacers as necessary to achieve the desired thickness.

Advantageously, the axial spacer of the present invention provides a lightweight member which can greatly increase the effectiveness of a cooling fan and shroud assembly. Due to the construction and the particular interfacing of the various components of the body, the overall structure is quite robust while not contributing significantly to the rotational inertia of the spinning assembly.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A one-piece monolithic axial spacer for a rotational assembly, comprising:
    a body having an outer ring, wherein the outer ring includes a top surface and a bottom surface, an inner ring, wherein the inner ring includes a top surface and a bottom surface, and further wherein the inner ring is spaced apart from the outer ring, a plurality of reinforcing members extending between the inner ring and the outer ring, and a plurality of web members extending between adjacent reinforcing members and the inner and outer ring;
    means for attaching the spacer to a rotational assembly, the attaching means comprising an opening extending through at least a plurality of the plurality of reinforcing members; and
    means for centering the spacer relative to the rotational assembly, wherein the centering means comprises a centering flange disposed on an inner surface of the inner ring, wherein the centering flange includes a top surface and a bottom surface, and wherein the centering flange is offset relative to the inner ring such that the bottom surface of the flange is positioned between the top and bottom surface of the inner ring and the top surface of the flange is positioned above the top surface of the inner ring, and such that a step is formed by the centering flange relative to the inner ring.

2. The monolithic axial spacer of claim 1 wherein the plurality of reinforcing members each comprise:
    an annular reinforcing rim extending from the outer ring; and
    a connecting beam extending from the annular reinforcing rim to the inner ring.

3. The monolithic axial spacer of claim 2 wherein an arcuate portion of the annular reinforcing rim substantially blends with the outer ring.

4. The monolithic axial spacer of claim 3 wherein the arcuate portion is about $\pi/2$ radians.

5. The monolithic axial spacer of claim 2 wherein the connecting beam of each one of the plurality of reinforcing members is positioned between the inner ring and the annular reinforcing rim.

6. The monolithic axial spacer of claim 2 wherein the annular reinforcing rim has a diameter which is greater than ⅛ that of the outer ring.

7. The monolithic axial spacer of claim 2 wherein a width of the connecting beam of each of the reinforcing members is substantially equal to the radial thickness of each of the inner ring and the outer ring.

8. The monolithic axial spacer of claim 2 wherein the annular reinforcing rim further includes a compression limiter insert associated therewith, wherein the compression limiter insert limits the compression of the axial spacer upon deployment.

9. The monolithic axial spacer of claim 2 wherein the annular reinforcing rim of each of the reinforcing members and the respective opening extending therethrough define a radial thickness of the annular reinforcing rim, the radial thickness of the annular reinforcing rim is substantially equal to a radial thickness of the outer ring.

10. The monolithic axial spacer of claim 1 wherein the web members each have a thickness which is between approximately 10% and 90% of the thickness of the outer ring.

11. The monolithic axial spacer of claim 1 wherein each of the web members are substantially planar and of a substantially uniform thickness.

12. The monolithic axial spacer of claim 1 wherein a radial thickness of the outer ring is substantially identical to the radial thickness of the inner ring.

* * * * *